United States Patent Office 3,246,005
Patented Apr. 12, 1966

---

3,246,005
ORGANOPHOSPHORUS COMPOUNDS CONTAINING A DISULFIDE GROUPING AND A METHOD OF PREPARING THEM
Karoly Szabo, Yonkers, N.Y., and John G. Brady, Campbell, Calif., assignors to Stauffer Chemical Company, New York, N.Y., a corporation of Delaware
No Drawing. Filed Dec. 7, 1961, Ser. No. 157,819
12 Claims. (Cl. 260—306.5)

This invention relates to organophosphorus compounds and, in particular, to organophosphorus esters in which a phosphoric ester function is combined with a disulfide linkage. The invention further pertains to biocidal compositions such as insecticides, acaricides and the like containing as the active component thereof at least one of the aforesaid organophosphorus esters and to methods of preparing, using and applying such compositions.

The organophosphorus esters, as contemplated herein, have at least one triphosphoricmethyl grouping attached to a disulfide linkage and can be depicted formalistically as follows:

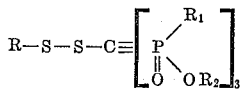

wherein R represents an organic radical in which the number of carbon atoms varies from about 2 to 30 although R is preferably selected from among such moieties as exemplified by a lower aliphatic group such as an allyl radical, e.g., chloroallyl, bromoallyl, etc., propargyl, propenyl, 1-butenyl, 2-butenyl and the like, a lower alkyl radical such as methyl, chloromethyl, ethyl, β-chloroethyl,, n-propyl, isopropyl, secbutyl, isobutyl, 3-chloropropyl, 3-bromopropyl and the like, a cyclo alkyl radical such as cyclopentyl, cyclohexyl, cyclopropyl, bornyl and the like, an aromatic hydrocarbon radical of the benzene and naphthalene series such as phenyl, p-chlorophenyl, m-chlorophenyl, p-tolyl, m-tolyl, 2-biphenylyl, 4-biphenylyl, anisyl, a naphthyl radical such as α-naphthyl, β-naphthyl and the like, an aralkyl radical wherein the aryl portion is of the benzene and naphthalene series as above and the alkyl grouping contains from 1 to 3 carbon atoms said aralkyl radical being phenethyl, 3-phenylpropyl, α-napthyl-methyl, α-naphthylethyl β-naphthylethyl and the like, a heterocyclic nucleus constituting a monocyclic or a bicyclic system in which the hetero ring contains 5 to 6 atoms as exemplified by the pyridine series, the pyrimidine series, the pyrazine series, the pyridazine series, the s-triazine series, the pyrazole series, the 2-quinoline series, the 4-quinoline series, the furane series, the thiophene series and the benzothiazole series; lower alkoxylthiocarbonyl a triphosphoric methyl grouping of the configuration

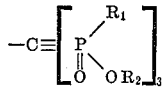

wherein R₁ and R₂ have the significance as above given in the general formula, it being further provided or understood that when R is equal to a triphosphoric methyl grouping both of said triphosphoric methyl groupings are identical; R₁ is lower alkoxyl and its chloro and bromo derivatives, a lower alkyl or hydrocarbon aromatic radical as above defined for R and R₂ is a lower alkyl radical. Compounds falling within the ambit of the above depicted general formula include:

Compound 1

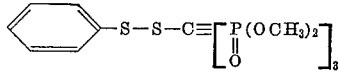

Compound 2

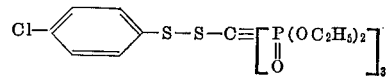

Compound 3

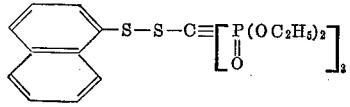

Compound 4

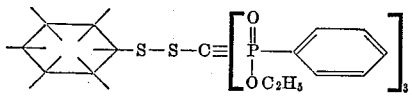

Compound 5

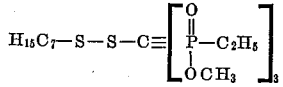

Compound 6

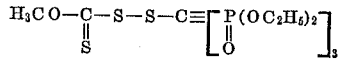

Compound 7

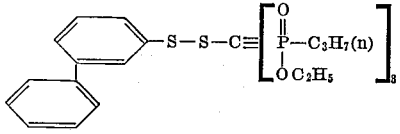

Compound 8

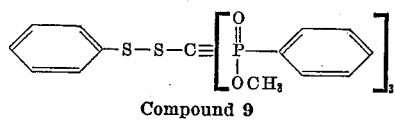

Compound 9

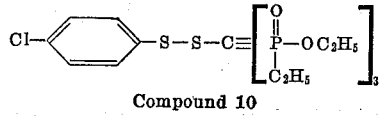

Compound 10

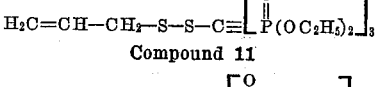

Compound 11

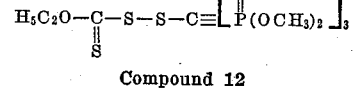

Compound 12

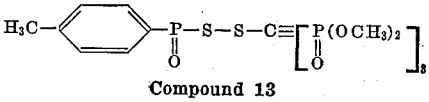

Compound 13

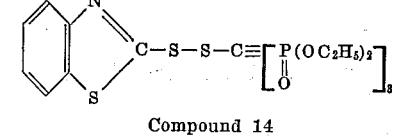

Compound 14

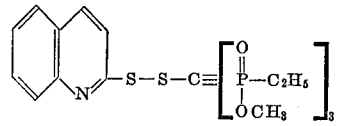

Compound 15

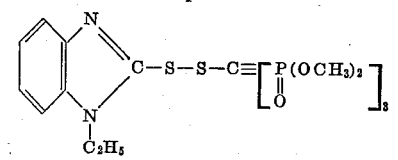

Compound 16
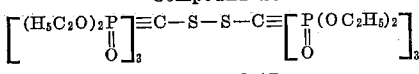

Compound 17
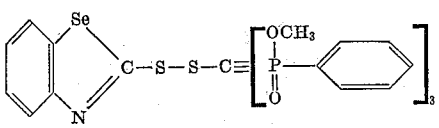

Compound 18
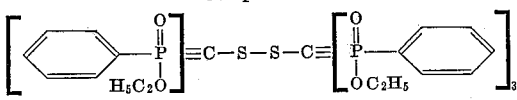

Compound 19

Compound 20
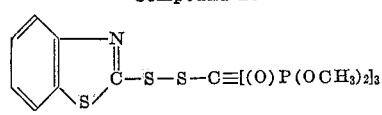

Compound 21
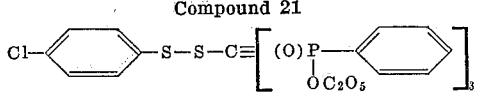

Compound 22
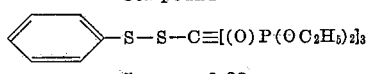

Compound 23
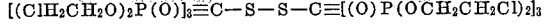

Compound 24
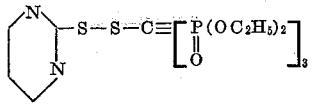

Compound 25
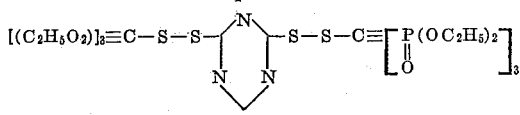

In general, it has been our finding that the compounds of this invention can be prepared by reacting a phosphorous ester with an organic disulfide having the following structure:

$$Y-S-S-CCl_3$$

wherein Y can be a trichloromethyl group or equal to the previously defined R. When the reaction is carried out with a symmetrical disulfide, that is in those instances where Y is equal to a trichloromethyl group, a symmetrical structure is produced and all of the chlorine atoms react with the phosphorous ester. There is accordingly produced a bi-symmetrical structure in which a triphosphoricmethyl group is attached to each end of the disulfide bridge. A typical structure of the aforesaid type is illustrated by Compound 18. The course of the reaction wherein Y is equal to R is shown schematically in the equation below:

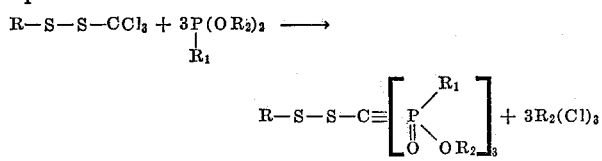

in which R, R₁ and R₂ have the significance previously set forth.

The reaction is desirably performed in the presence of a relatively inert solvent using approximately 3 moles of the phosphorus ester for every trichloromethyl group. As a consequence, when the organic disulfide contains two terminal trichloromethyl residues, it is then necessary to use 6 moles of the phosphorus ester. It is to be understood, however, that such proportions are only approximate and may be altered or otherwise modified to suit a particular situation. When the phosphorus ester and trichloromethyl disulfide are brought together, a vigorous exothermic reaction occurs with evolution of an alkyl chloride. After the initial vigorous reaction subsides, the components are refluxed in order to complete the reaction. The desired product can then be isolated, utilizing those techniques well known in the organic chemistry field, the usual procedure being to distill off the volatile components whereby the product is obtained as an oily residue.

Solvents which are suitable as a media for carrying out the reaction are desirably of the relatively inert organic variety and include such members as are normally liquid at room temperature as exemplified by paraffinic and aromatic hydrocarbons including their chlorinated derivatives, aliphatic saturated ethers and the like.

In order to spell out more clearly the various processes and products described herein, reference is now made to the following examples. However, these examples are inserted for the purpose of illustration only and those skilled in the art will appreciate that various modifications and ramifications of the invention can be practiced without departing from the spirit or scope thereof.

*Example 1*

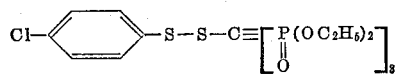

14.7 g. of p-chlorophenyl trichloromethyl disulfide was dissolved in 50 ml. of benzene and to the resulting mixture was added in portions, a solution of 26.0 g. triethylphosphite in 50 ml. of benzene. The contents of the flask were stirred during the introduction of the ester and the temperature maintained below 50° C. After all of the triethylphosphite had been introduced which required about 15 minutes, another gram of ester was added and the mixture allowed to remain at room temperature for 2 hours. The solvent was then removed by distillation under reduced pressure, after which the reaction was heated at 100° C. at 1 mm. in order to remove any p-chlorothiophenol. There was obtained 30 g. of a dark yellow oily residue, having a refractive index of 1.4968 at 25° C. The structure of the product corresponded to the above depicted formula.

*Example 2*

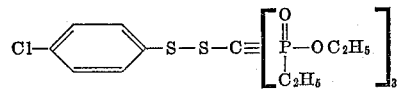

This preparation was carried out in accordance with the procedure of Example 1, but using diethyl ethylphosphonite in lieu of the triethylphosphite of the first example. In general, the results and yields paralleled those as obtained in the case of Example 1. The structure corresponded to the above depicted formula and the product was a yellow oil having a refractive index of 1.5100 at 25° C.

*Example 3*

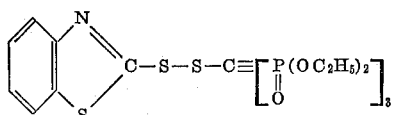

This preparation was carried out in accordance with the procedure of Example 1, using 2-benzothiazolyl trichloromethyl disulfide and triethylphosphite as the reactants. In general, the results and yields were in consonance with those obtained in the case of the previous examples. The product obtained was a dark reddish oil, the refractive index of which was 1.5271 at 25° C. The 2-benzothiazolyl trichloromethyl disulfide used as an intermediate in this example was obtained by condensing approximately 1 mole of perchloromethylmercaptan and 2-benzylthiazolethiol in approximately equal molar proportions.

Example 4

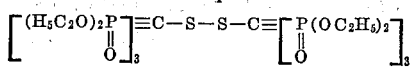

6 moles of triethylphosphite was added in portions to 2 moles of bistrichloromethyl disulfide. After the vigorous reaction had subsided and approximately the theoretical quantity of ethylchloride had been evolved, the reaction mixture was distilled under reduced pressure to remove the solvent plus any volatile products. The desired product was obtained as a yellow oily residue having a refractive index of 1.4702 at 25° C.

Example 5

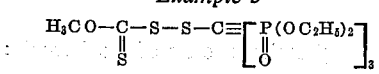

19.3 g. (0.075 M) of O-methyl-S-trichloromethyl-thioxanthate was dissolved in 100 ml. of benzene to which was then added a slight molar excess of triethylphosphite. The ester was added in portions while maintaining the reaction temperature below 55° C. After all the triethylphosphite had been introduced, the solvent was distilled off under reduced pressure and the desired product obtained as a yellowish orange oil, the refractive index of which was 1.4570 at 25° C.

The following list of examples were prepared in accordance with the procedure given in the earlier examples:

or the like and use such organic solutions directly. However, it is more common procedure to employ dispersion of the toxicant in an aqueous media and such compositions may be produced by forming a concentrated solution of the toxicant in a suitable organic solvent follower by dispersion in water, usually with the aid of surface active agents. The latter, which may be the anionic, cationic or nonionic types, are exemplified by sodium stearate, potassium oleate and other alkali metal soaps and detergents such as sodium lauryl sulfate, sodium naphthalene, sulfonate, sodium alkyl naphthalene sulfonate, methyl cellulose, polyoxyethylene, fatty alcohol ethers, polyglycol fatty acid esters and other polyoxyethylene surface active agents. The preparation of these agents commonly comprises 1-15% by weight of the pesticidal compositions although the proportion is not critical and may be varied to suit any particular situation.

Other adjuncts may be resorted to in compounding biocidal formulations based on the herein described organophosphorus esters and, in this connection, reference is made to adhesives, spreaders, activators, fertilizers and the like. The preparation of pesticidal compositions incorporating the organophosphorus esters of this invention and the results of testing such compositions are spelled out in the following test procedures:

*Acaricidal evaluation test.*—The two-spotted mite, *Tetranchus telarius* (Linn) is employed in tests for acarides. Young pinto bean plants are infested with several hundred mites. Dispersions of test compounds are prepared by dissolving 0.1 gram of the toxic material

| Example | | Characterization | Refractive index |
|---|---|---|---|
| 6 | $\left[\underset{OC_2H_5}{\underset{\|}{\overset{O}{\overset{\|}{\text{Ph-P}}}}}\right]_3\equiv C-S-S-C\equiv\left[\underset{OC_2H_5}{\underset{\|}{\overset{O}{\overset{\|}{\text{P-Ph}}}}}\right]_3$ | Red oil | 1.5464 |
| 7 | $\left[(CH_3O)_2\overset{O}{\overset{\|}{P}}\right]_3\equiv C-S-S-C\equiv\left[\overset{O}{\overset{\|}{P}}(OCH_3)_2\right]_3$ | Yellow oil | 1.4648 |
| 8 | (benzothiazolyl)-C(=S)-S-S-C≡[P(O)(OCH_3)_2]_3 | Orange oil | 1.5610 |
| 9 | Cl-Ph-S-S-C≡[P(O)(Ph)(OC_2H_5)]_3 | Yellow oil | 1.5894 |
| 10 | Ph-S-S-C≡[P(O)(OC_2H_5)_2]_3 | do | 1.4932 |
| 11 | $\left[(ClCH_2CH_2O)_2\overset{O}{\overset{\|}{P}}\right]_3\equiv C-S-S-C\equiv\left[\overset{O}{\overset{\|}{P}}(OCH_2CH_2Cl)_2\right]_3$ | Orange oil | 1.5157 |

In realizing the optimum biocidal activity of the herein contemplated compounds it is desirable that they be formulated with suitable adjuncts. Thus pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cotton seed and so forth.

Liquid compositions are also useful and normally comprise a dispersion of the toxicant in a liquid media. For instance, it may be convenient to dissolve the toxicant directly in a solvent such as xylene, alkylated naphthalenes in ten milliliters acetone. This solution is then diluted with water containing 0.015% Vatsol (sodium salt of isopropylnaphthalene sulfonate) and 0.005% Methocel (methylated cellulose) as emulsifiers, the amount of water being sufficient to give concentrations of active ingredient ranging from 0.25% to 0.005%. The test suspensions are then sprayed on the infested pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the columns "2 SM" and "2 SM eggs" on the following table.

*Insecticidal evaluation tests.*—Four insect species are subjected to evaluation tests for insecticides:

(1) American cockroach (AR), *Periplaneta americana* (Linn)
(2) Milkweed bug (MWB), *Oncopeltus fasciatus* (Dallas)
(3) Confused flour beetle (CFB), *Tribolium confusum* (Duval)
(4) House fly (HF), *Musca domestica* (Linn)

The procedure for insects is similar to the miticidal testing procedure. Test insects are caged in cardboard mailing tubes 3⅛″ in diameter and 2⅝″ tall. The cages are supplied with cellophane bottoms and screened tops. Ten to twenty-five insects are used per cage. Food and water are supplied in each cage. The confused flour beetles are confined in petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to determine living and dead insects. The LD–50 values are calculated using well known procedures, and reported in the table below.

TABLE

| Compound | House fly ($\mu$g.) | American Roach (percent) | Milkweed bug (percent) | Confused flour beetle ($\mu$g.) | 2-Spotted Mite (percent) | 2-Spotted Mite eggs (percent) |
|---|---|---|---|---|---|---|
| 2 | <100>10 | <.05>.02 | <.025 | 10 | <.06>.01 | <.06>.01 |

We claim:
1. An organophosphorus ester of the formula:

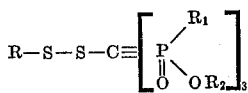

wherein R is selected from the class consisting of a lower aliphatic hydrocarbon group and its chloro and bromo derivatives; cyclopentyl; cyclohexyl; phenyl; chlorophenyl; naphthyl; heterocyclic selected from the class consisting of pyridine, pyrimidine, pyrazine, pyridazine, S-triazine, pyrazole, 2-quinoline, 4-quinoline, furane, thiophene and benzothiazole; lower alkoxylthiocarbonyl and the configuration

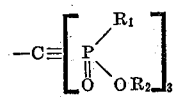

wherein $R_1$ is selected from the class consisting of lower alkoxyl and its chloro and bromo derivatives, lower alkyl, phenyl and naphthyl and $R_2$ represents lower alkyl.

2. An organophosphorus ester of the formula:

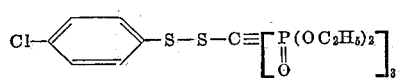

3. An organophosphorus ester of the formula:

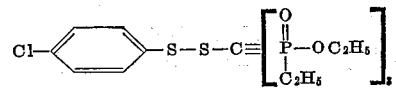

4. An organophosphorus ester of the formula:

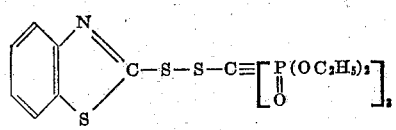

5. An organophosphorus ester of the formula:

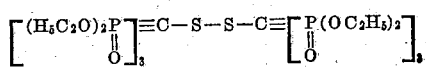

6. An organophosphorus ester of the formula:

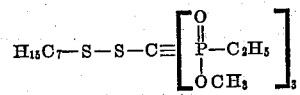

7. An organophosphorus ester of the formula:

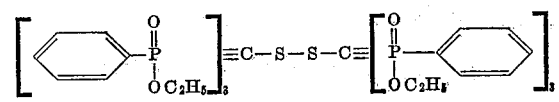

8. An organophosphorus ester of the formula:

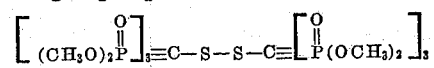

9. An organophosphorus ester of the formula:

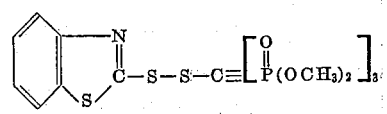

10. An organophosphorus ester of the formula:

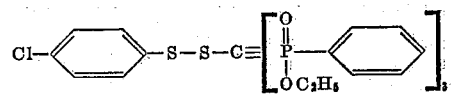

11. An organophosphorus ester of the formula:

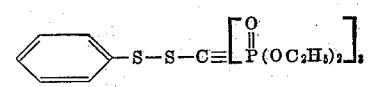

12. An organophosphorus ester of the formula:

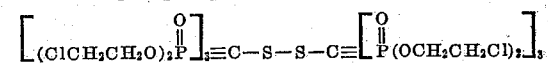

(References on following page)

References Cited by the Examiner

UNITED STATES PATENTS

| | | | |
|---|---|---|---|
| 2,535,174 | 12/1950 | Tawney | 260—461 |
| 2,553,777 | 5/1951 | Hawley | 167—22 |
| 2,724,718 | 11/1955 | Stiles | 260—461 |
| 2,725,359 | 11/1955 | Harman et al. | 260—461 XR |
| 2,728,806 | 12/1955 | Morris et al. | 260—461 |
| 2,818,364 | 12/1957 | Birum et al. | 260—461 XR |
| 2,830,058 | 4/1958 | Young | 260—306.5 |
| 2,837,519 | 6/1958 | Hardman | 260—306.5 |
| 2,857,304 | 10/1958 | Birum | 260—461 XR |
| 2,857,305 | 10/1958 | Birum | 260—461 XR |
| 2,857,306 | 10/1958 | Gluesenkamp et al. | 260—461 XR |
| 2,877,155 | 3/1959 | Metivier | 167—33 |
| 3,058,876 | 10/1962 | Birum | 167—22 |

OTHER REFERENCES

Cressman et al., "U.S. Dept. Agr. ARS 33–68" (1961).

Walker et al., "J. Econ. Entomol.," vol. 53, pp. 228–231 (April 1960).

CHARLES B. PARKER, *Primary Examiner.*

D. T. McCUTCHEN, *Examiner.*

FRANK M. SIKORA, DELBERT R. PHILLIPS,
*Assistant Examiners.*